(12) United States Patent
Lancaster et al.

(10) Patent No.: US 9,061,469 B2
(45) Date of Patent: Jun. 23, 2015

(54) FLUID BARRIERS WITH FLEXIBLE BACKING MATERIAL AND METHODS OF REPAIRING AND MANUFACTURING THE SAME

(75) Inventors: Ted H. Lancaster, Suffield, CT (US); William Bogue, Hebron, CT (US); Brian Kenneth Holland, Lansing, MI (US); Christopher J. Hertel, Wethersfield, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 2043 days.

(21) Appl. No.: 12/054,462

(22) Filed: Mar. 25, 2008

(65) Prior Publication Data

US 2009/0243220 A1    Oct. 1, 2009

(51) Int. Cl.
*B29C 73/00* (2006.01)
*B29C 73/02* (2006.01)
*B29C 73/04* (2006.01)
*B29C 73/10* (2006.01)

(52) U.S. Cl.
CPC ........... *B29C 73/02* (2013.01); *Y10T 29/49719* (2015.01); *Y10T 29/49297* (2015.01); *B29C 73/04* (2013.01); *B29C 73/10* (2013.01); *F05B 2230/80* (2013.01); *F05C 2225/00* (2013.01); *F05C 2253/04* (2013.01)

(58) Field of Classification Search
CPC ...................................................... B29C 73/00
USPC ......... 277/323, 370, 421, 435, 511, 551, 598, 277/609, 630
See application file for complete search history.

(56) References Cited

U.S. PATENT DOCUMENTS

| | | | |
|---|---|---|---|
| 4,406,459 A | 9/1983 | Davis | |
| 4,449,714 A | 5/1984 | Meier | |
| 4,799,695 A * | 1/1989 | Yoshino | ......................... 277/592 |
| 4,924,581 A | 5/1990 | Jakobsen | |
| 4,945,623 A | 8/1990 | Porter | |
| 5,662,964 A * | 9/1997 | Zecchin | ......................... 427/232 |
| 5,972,424 A | 10/1999 | Draghi | |
| 6,010,746 A | 1/2000 | Descoteaux | |
| 6,138,718 A * | 10/2000 | Maimets | ......................... 138/98 |
| 6,565,257 B1 | 5/2003 | Kennedy | |
| 6,575,696 B1 | 6/2003 | Lyons | |
| 6,737,134 B2 * | 5/2004 | Friedrich et al. | ............. 428/36.3 |
| 7,017,793 B2 | 3/2006 | Kinstler | |
| 7,025,356 B1 | 4/2006 | Cheung | |
| 2007/0240819 A1 | 10/2007 | Bogue et al. | |
| 2008/0000193 A1 | 1/2008 | Holland et al. | |

OTHER PUBLICATIONS

U.S. Appl. No. 11/862,584, filed Sep. 27, 2007, entitled "Pressurized Cleaning of a Turbine Engine Component".

* cited by examiner

*Primary Examiner* — Shane Bomar
*Assistant Examiner* — Kipp Wallace
(74) *Attorney, Agent, or Firm* — Carlson, Gaskey & Olds, PC

(57) ABSTRACT

A component to be repaired includes a relatively rigid plate. On a surface that may have been subject to fracture, a resin material is first laid down, then a relatively flexible material is positioned outwardly of the resin material to repair the barrier. A part may also be formed initially with the flexible material. In another feature of this application, a method of forming a barrier includes providing a composite material, and applying a relatively flexible material on a surface of the composite material, and concurrently molding the relatively flexible material with the composite material using a composite mold.

9 Claims, 1 Drawing Sheet

FLUID BARRIERS WITH FLEXIBLE BACKING MATERIAL AND METHODS OF REPAIRING AND MANUFACTURING THE SAME

BACKGROUND OF THE INVENTION

This application relates to relatively rigid fluid barriers and methods of repairing and manufacturing the barriers by applying flexible backing material.

Gas turbine engines are known and include a plurality of distinct components. Various fluids move within a gas turbine engine, and it is desirable to provide barriers to prevent the fluids from reaching certain areas. One type of barrier is an air-oil seal, which separates an air holding chamber from an area that might hold oil. One known air-oil seal includes a relatively rigid plate fabricated from fiberglass, and perhaps other materials such as epoxy.

The rigid plate may become saturated with oil during operation. Moreover, the plate may crack and develop a plurality of small fractures, which may allow air or oil to pass through walls of the barrier. In the past, there has been no good known method to repair the barrier. As a result, entire replacement of the air-oil seal was performed to replace the defective barrier. Because the air-oil seals are relatively expensive, cheaper methods of repairing the barriers for further use would be desirable. It is also desirable to manufacture the air-oil seals that extend service life without repair.

Various methods for cleaning and performing maintenance steps on air-oil seals are disclosed in patent applications such as U.S. application Ser. No. 11/862,584, filed on Sep. 27, 2007, and titled "Pressurized Cleaning of a Turbine Engine Component," or, alternatively, patent application Ser. No. 11/396,479, filed on Apr. 3, 2006, titled "Metallic Doubler Repair of Composite Arcuate Flanges," which is U.S. Published Application 2007/0240819A1. Also, the last mentioned application has a related continuation-in-part application, Ser. No. 11/897,887, filed Aug. 31, 2007, which is U.S. Published Application 2008/0000193.

SUMMARY OF THE INVENTION

In a method of repair, a relatively rigid component is restored by application of a thermosetting resin placed over the component, at least on the areas including fractures, and then a relatively flexible material is placed outwardly of the thermosetting resin.

Also, a barrier can be manufactured as a new component with a flexible fluoroelastomer backing material.

In another feature of this application, a method of forming a barrier includes providing a composite material, and applying a relatively flexible material on a surface of the composite material, and concurrently molding the relatively flexible material with the composite material using a composite mold.

These and other features of the present invention can be best understood from the following specification and drawings, the following of which is a brief description.

DETAILED DESCRIPTION OF THE PREFERRED EMBODIMENT

Figure 1:
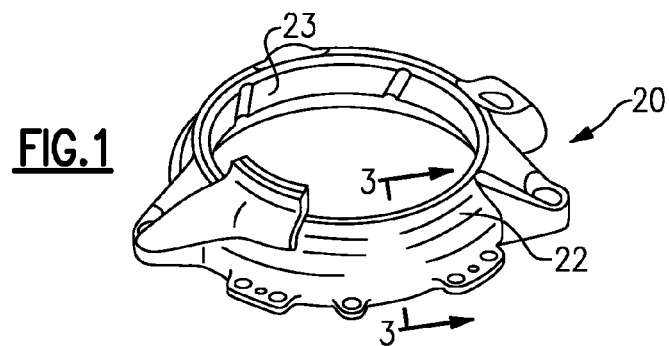
FIG. 1 shows an exemplary air-oil seal.

FIG. 1 illustrates a fluid seal component such as an air-oil seal 20 that includes a relatively rigid plate 22. A relatively rigid component substrate of the air-oil seal 20 is typically fabricated from binding fibers such as, but not limited to, fiberglass, aromatic polyamide, or carbon, using a matrix material stable to the operating environment. The matrix material may be a thermosetting resin such as, but not limited to, epoxy, bimaleimide (BMI), cyanate ester or polyimide, or a thermoplastic material such as, but not limited to, a polyetherimide (PEI), polyamide-imide, or polyimide.

Failure of the air-oil seal 20 is first observed by an inability to act as a barrier between fluids. Although the plate 22 may retain sufficient structure such that it will not burst, an additional mechanism in the exemplary embodiment may be installed either at original manufacture or subsequent to manufacture in order to maintain the barrier performance in service.

The plate 22 has an internal aperture 23, which surrounds a shaft in a gas turbine engine when assembled in the engine. During engine operation, the material of plate 22 may become saturated with oil. Additionally the matrix material of the plate 22 may swell, craze or crack such that the plate 22 is no longer able to effectively function as a barrier between air and oil without assistance of an additional compliant feature that will bridge the defects.

Figure 2:
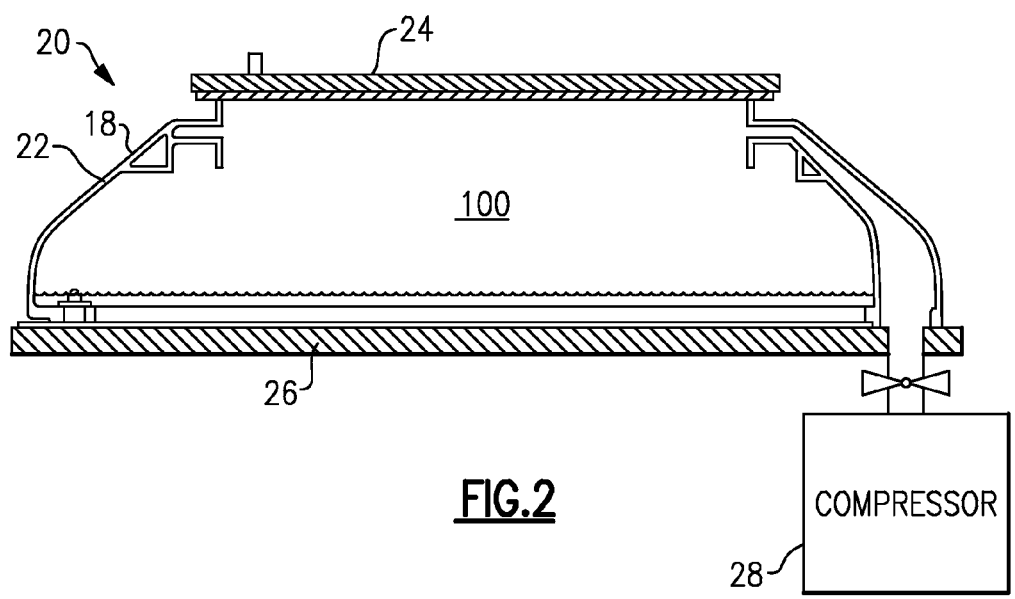
FIG. 2 shows an exemplary test stand for testing the integrity of the air-oil seal.

One exemplary method of testing the integrity of the air-oil seal plate 22 is described with respect to exemplary testing stand illustrated in FIG. 2. The air-oil seal 20 include plates 24 and 26 that are placed on opposed ends of the plate 22 to define an interior space 100. An air compressor 28 is placed in flow communication with the air-oil seal 20 to pressurize the interior space 100. If the plate 22 includes voids, fractures, and/or a network of fractures that would allow leakage of fluid, such as air, through the plate 22 will become apparent during the test.

Figure 3A:
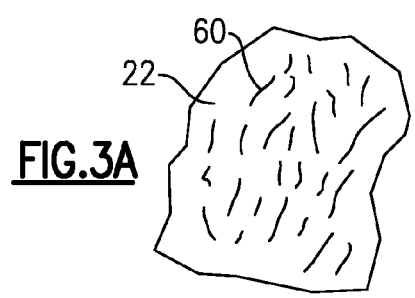
FIG. 3A is an exemplary view of a fracture in a first area of the air-oil seal.

The fractures may occur as a number of smaller fractures spaced across a larger area, such as fractures 60 as shown in FIG. 3A.

Figure 3B:
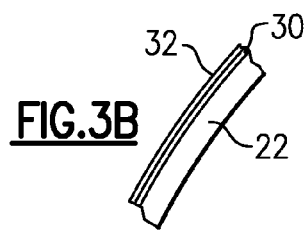
FIG. 3B shows an exemplary repair method being performed.

In the exemplary embodiment, and as shown for instance in FIG. 3B, a resin, such as an epoxy or BMI material 30 is used as a preliminary repair step to coat sides of the plate 22. The resin material 30 facilitates filling the fractures, cracks and/or voids to restore physical continuity of the underlying plate 22. Then a relatively flexible material, which is tolerant to the operating environment of the plate 22, is placed in a layer 32 outwardly of the resin 30. That is, on an opposed side of resin layer 30 from the nominal surface of plate 22. In one embodiment, this relatively flexible material layer 32 may be an elastomeric material. One acceptable material may be fluoroelastomers such as, but not limited to, fluorosilicones and fluorocarbons. One acceptable material is available under the trade name Viton™. The use of the elastomeric material allows the seal to be re-used, as it will effectively block leakage of fluid across the plate. Some method of cleaning the air-oil seal may also be utilized prior to the application of the epoxy material.

The resin layer is compatible with the component substrate of the air-oil seal 20 and durable in the operating environment of the component. Typical resins are either epoxy or BMI materials, but some component matrix materials may include different resins, usually similar to the matrix material.

Although the exemplary embodiment is shown for repairing an air-oil seal, it should be appreciated that exemplary repair method may be utilized to repair other fluid seals.

An analogous flexible material layer 32 may be installed to the component substrate prior to the seal entering service. Although the layer may be installed in a manner as described above for repair, the seal is already clean and does not require a resin coat.

Figure 4B:
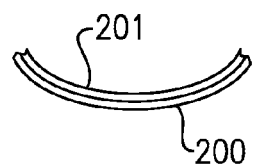
FIG. 4B shows the results of the FIG. 4a process.
Figure 4A:
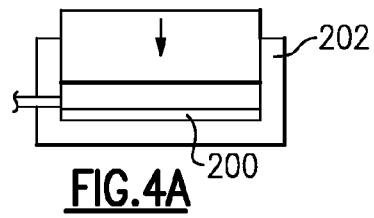
FIG. 4A shows an exemplary molding process.

A more cost effective manufacturing method for installing the flexible layer would be to concurrently mold the flexible material layer with the molding of composite material of the air-seal as shown in FIG. 4A. Fluoroelastomer materials are available in a partially cured sheet that is known to be readily compatible with multiple molding techniques known to one skilled in the art. One exemplary method is to install an uncured flexible layer 200 to a surface of a composite 201 using compression and a composite mold. When the uncured flexible layer 200 is cured, it will be integral to the composite surface 201 as shown in FIG. 4B.

Although exemplary embodiments have been disclosed, a worker of ordinary skill in this art would recognize that certain modifications would come within the scope of this invention. For that reason, the following claims should be studied to determine the true scope and content of this invention.

What is claimed is:

1. A method of repairing a rigid seal component comprising the steps of:

(a) applying a surface resin to a surface of the component, wherein applying the resin is at least in an area effected by potential fractures and wherein the component is formed of a matrix material including a thermo-setting resin, and including binding fibers; and (b) applying a relatively flexible material, which is more flexible than a rigid material used to fabricate the component, wherein applying the relatively flexible material is at least on an opposed side of the resin spaced away from the surface.

2. The method as set forth in claim 1, wherein the relatively flexible material is an elastomeric material.

3. The method as set forth in claim 2, wherein the elastomeric material is a fluoroelastomer.

4. The method as set forth in claim 1, wherein the rigid material forming the component is a fiberglass material.

5. The method as set forth in claim 1, wherein the component is initially cleaned to remove oil prior to the application of the resin.

6. The method as set forth in claim 1, wherein the component is a fluid seal.

7. The method as set forth in claim 6, wherein the fluid seal is an air-oil seal.

8. The method as set forth in claim 1, wherein the area of potential fractures is identified by placing the component into a test rig wherein pressurized air is delivered into an interior of said component, and leaks are identified.

9. The method as set forth in claim 2, wherein the surface resin is one of an epoxy or bimaleimide material.

\* \* \* \* \*